Patented Nov. 16, 1937

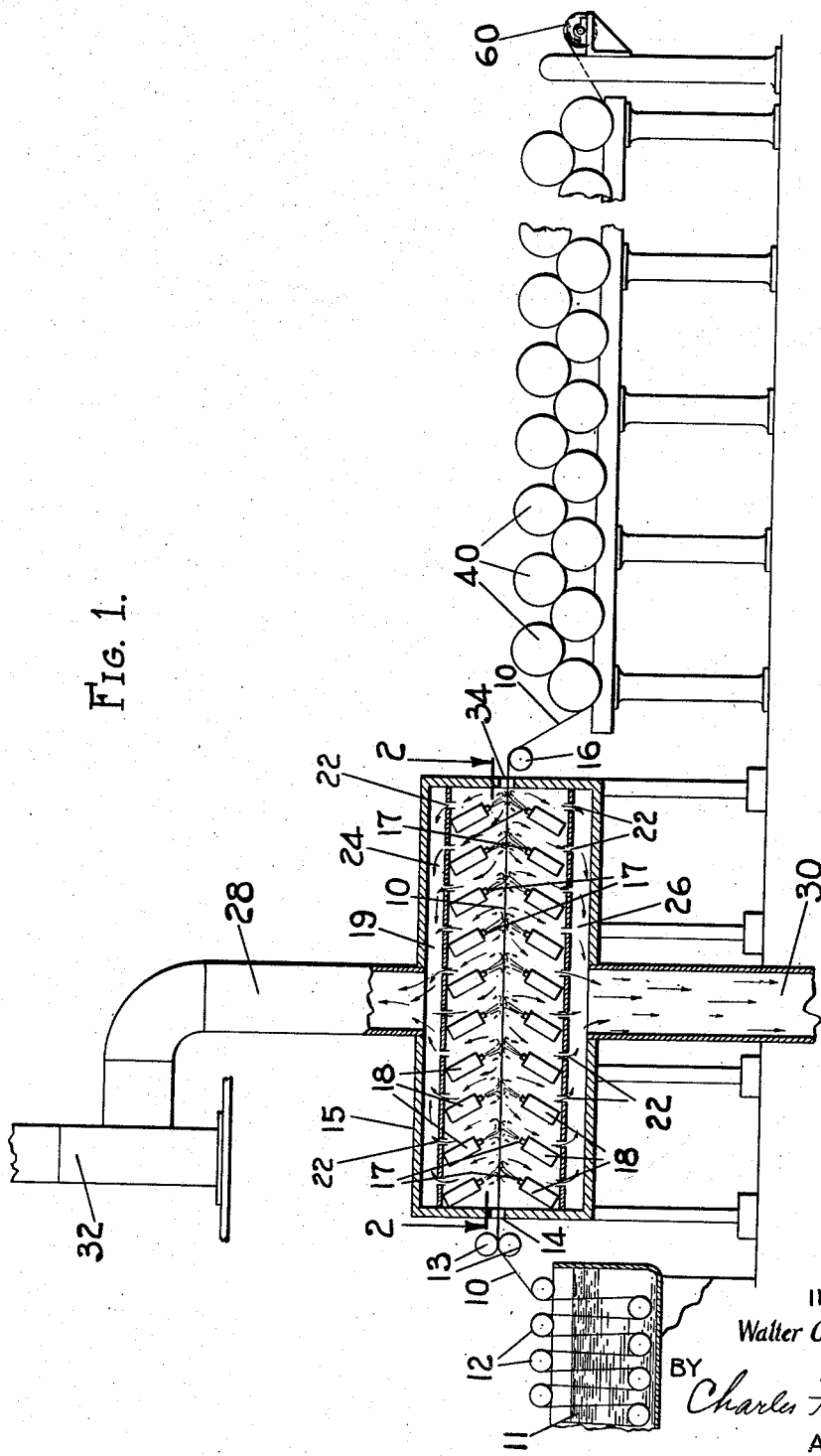

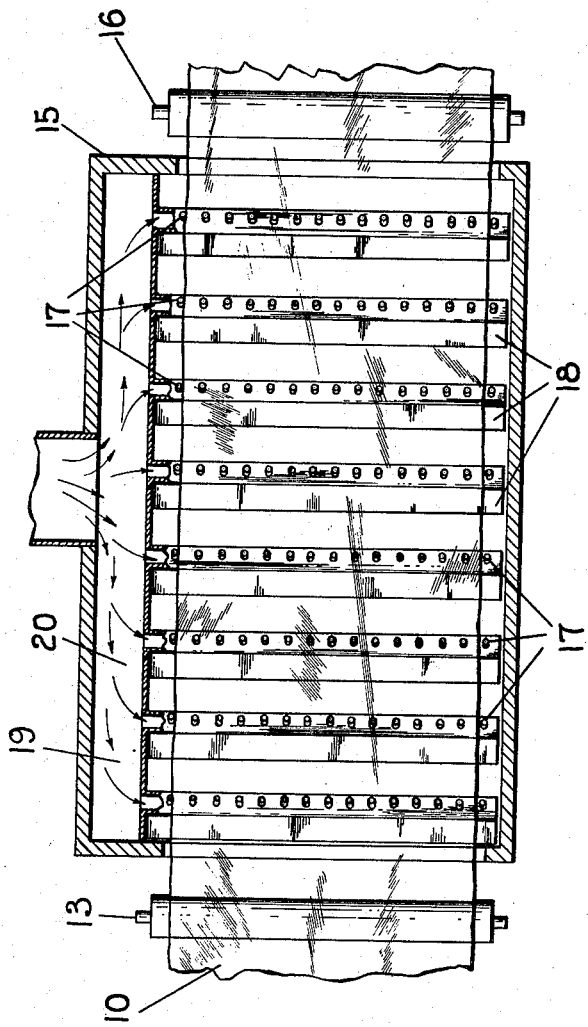

2,099,162

UNITED STATES PATENT OFFICE 2,099,162

PROCESS AND APPARATUS FOR DRYING

Walter C. Eberlin, Kenmore, N. Y., assignor, by mesne assignments, to E. I. du Pont de Nemours & Company, Wilmington, Del., a corporation of Delaware Application October 23, 1935, Serial No. 46,326

4 Claims. (Cl. 34—48)

This invention relates to the drying of non-fibrous sheets and films which are subject to shrinkage during drying. This invention will be particularly described with relation to the drying of regenerated cellulose sheeting cast from viscose and adapted to be used as a wrapping tissue.

Heretofore, in the manufacture of such sheets or films of regenerated cellulose a film was cast from viscose into a coagulating and/or regenerating bath and subsequently passed through additional baths such as regenerating, desulfuring, washing, bleaching and glycerinating baths. Thence, it was passed through a drying apparatus and wound up into rolls. In passing through the drying apparatus, the film loses moisture, and in losing this moisture it tends to shrink to a great extent, thus diminishing the area of the regenerated cellulose film and tending to produce puckers and wrinkles. In order to produce a relatively thin sheet or film of comparatively large area without puckers or wrinkles, the drying apparatus customarily consists of a series of rotating heated rolls around which the film passes and which, due to the friction between film and roll surfaces, keep it at all times under a marked tension and thus prevent or reduce shrinkage of the film.

It has been found desirable to apply various solutions or suspensions to wet sheets or films, hereinafter to be termed generally as webs, and particularly webs in the gel state, for the purpose of imparting certain special properties thereto. Where this is the case difficulty is encountered in the subsequent drying stage because the applied material tends to concentrate in the web as the liquid is removed until it reaches the point where it begins to stick to the rolls in whole or in part. This results in an increasing fouling of the roll surface so that the machine must soon be shut down for cleaning. At the same time there is a constant interchange of the material on the rolls with that in the web, some of the surface material in the web sticking to the rolls and some of the previously deposited material on the rolls again sticking to the web. When this happens, the web has a speckled or patched appearance due to the deposit thereon of small particles of the materials or due to the removal of small sections of the applied material therefrom. When it is realized that the ultimate product finds its greatest utility because of its glass-clear transparency, it will be readily seen that difficulties of this kind materially interfere and in some cases forbid the successful manufacture of film to which various solutions and suspensions have been applied.

Although the present invention is applicable to non-fibrous shrinkable sheets and films to which have been applied all types of materials which may during drying induce speckling of the finished sheet, I am primarily concerned with the drying of films to which non-heat-plastic materials have been applied, that is to say, materials which are not flowable under the application of a reasonable degree of heat and wherein there is no opportunity for removing the speckled or patched appearance.

It is therefore an object of my invention to provide a method and apparatus for drying non-fibrous, transparent sheets or films which are subject to shrinkage during the drying thereof.

It is another object of my invention to provide a method and apparatus for drying non-fibrous, transparent sheets or films, which contain substances for imparting special characteristics to said films, without the appearance of speckles or patches thereon.

It is a more specific object of my invention to provide a method and apparatus for drying a regenerated cellulose sheet or film containing a substance which may adhere to an adjacent surface during the drying thereof by preliminarily drying the sheet out of contact with any surface and completing the drying thereof in contact with a drying surface.

Other objects of the invention will appear hereinafter.

The objects of this invention can be accomplished generally by preliminarily drying a wet web out of contact with any surface by an application of intense heat until such time as contact with a surface will cause no undesirable results and subsequently completing the drying thereof while maintaining the same in close contact with a drying surface.

The invention will be more easily understood by reference to the following detailed description taken in connection with the accompanying illustrations of one specific embodiment thereof and in which:

Fig. 1 is a fragmentary diagrammatic elevational view of the drying apparatus;

Fig. 2 is a plan view on an enlarged scale taken along the line 2—2 of Fig. 1.

Referring to Fig. 1 of the drawings, reference numeral 10 designates a comparatively wide web of non-fibrous cellulosic material, such as regenerated cellulose which has been cast, regenerated, desulfured, bleached, washed and glycerinated but undried. This film is led through the liquid bath in vat 11 by passing the same over rolls 12. From rolls 12 the web is passed through squeeze rolls 13 after which it is led through a narrow opening 14 of the drying enclosure 15. The web has no contact with any solid surface throughout its passage through the enclosure 15, it being supported at opposite ends thereof by the squeeze rolls 13 and supporting roll 16. A plurality of headers 18 are positioned to project from the top and bottom of the enclosure 15. These headers, instead of being directed perpendicularly against the web are preferably arranged to project forwardly at an angle in the direction of the movement of the web. A large plurality of hot air or gas jets or open flame gas burners 17 are arranged on each header and are preferably positioned to project forwardly in the same direction as the headers. The headers are connected to a common chamber 19 which is supplied with heated gas or a combustible gas by the inlet conduit 20 (see Fig. 2). The burners or jets are so arranged in multiple units that the whole width of the web is exposed to the hot gases or products of combustion. When burners are used they are so spaced that sufficient passage exists between flames for an ample supply of secondary air to reach the flames and for the products of combustion to escape. The burners or jets may be made individually adjustable so that films showing wet bands will be dried to produce flat sheets.

A plurality of narrow outlet openings 22 for the hot gases or products of combustion are arranged intermediate the headers. The openings 22 in the upper portion of the enclosure 15 are connected to a common chamber 24 from which the gases or combustion products are withdrawn through the conduit 28 and suction fan 32. The openings 22 in the lower portion of the enclosure 15 are connected to the chamber 26 from which they are withdrawn through conduit 30 and a suction fan (not shown).

The film passes from the enclosure 15 through the narrow opening 34, thence over the supporting roll 16 to a series of heated drying rolls 40 which may be of the type disclosed in the United States Patent No. 2,046,553 to D. H. Edwards, or the type disclosed in the United States patent application of F. P. Alles and D. H. Edwards, No. 728,378, or both. The drying rolls 40 are provided in sufficient number to remove such remaining moisture content of the web as may be desirable. The web is then collected on the winding shaft 60 in the conventional manner.

The web may be drawn through the drying apparatus by imparting rotation to any of the rolls 12, 13, 16, and 40 or to all of them, as is well known in the art. If desired, succeeding driven rolls may be regulated with any desired or expedient speed differential means to compensate for film shrinkage or to prevent excessive shrinkage. For example, the circumferential speed of the drying rolls may be slower than the circumferential speed of squeeze rolls 13 to allow for web shrinkage in the drying of the film, as described and claimed in the copending application of William Hale Charch and Francis P. Alles, Serial No. 46,324 filed of even date.

With the described arrangement it is possible to eliminate in from 3 to 15 seconds the surface layer of water on the web. This can be seen by comparing the appearance of the first drier roll when the gas flames or hot gases are turned on with its appearance when no flames or hot gases are used. In the first case the roll surface remains dry while in the second it becomes wet. By continuous operation with the gas flames or heated gases the drier rolls, if clean to begin with, remain clean and the appearance of the web is good. Without the flames or gases the drier rolls rapidly become fouled by material deposited from the web and the web surface becomes covered with speckle marks or specks due to deposition of material from the dirty rolls or to removal of portions of the coating from the web, and due to material left on the surface of the web until it is dried there.

Heretofore it was deemed impracticable to dry a film having a large moisture content without proper mechanical support. Prior to this invention, it was contended that a wet web, for example, a web which is still in the gel state, would shrink unduly unless it were restrained from shrinking by contact with rollers or other surfaces. As a matter of fact, the prior art taught the necessity of having the several rollers spaced closely together so that the film would be unsupported for a minimum period of time as it passed from one roller to another. Furthermore, it was recognized that the film at this stage was very weak and poorly adapted to handling without support.

Contrary to prior accepted practice and belief, I have found that when a part of the water carried by the wet web was removed by evaporation, the first liquid lost by the web was always the free surface layer which could be removed without causing any objectionable amount of shrinkage of the web nor impairment of its strength or other physical characteristics. Moreover, when the drying is so conducted that the free surface layer of liquid is evaporated without evaporating any considerable quantity in excess of this, the web, while to all appearances wet, does not cause wetting of any surface with which it thereafter comes in contact. I have furthermore found that the required degree of drying can be best achieved by a short application of relatively intense heat, such as direct impingement of open flames or very hot gas against the wet web.

For purposes of clarity, it should be stated that a film of regenerated cellulose leaving the wet end of the casting machine and entering the dry end is largely swollen with water and contains in excess of 300% water, (all figures are based on dry cellulose) whereas the film as marketed contains less than 10% water. In the production of film carrying non-heat-plastic, solid material, which is introduced in the course of the passage of the film through the wet end of the casting machine, a reduction in water content of the gel film to 150% to 225% water will remove all the surface water and insure the absence of speckling when the film makes contact with the usual drier rolls. It is to be understood, of course, that I may reduce the water content below 150% whether or not free shrinkage is allowed to take place. For example, I may wish to allow free shrinkage down to a water content of 100% to 200%, as described and claimed in the aforementioned application to William Hale Charch and Francis P. Alles, Serial No. 46,324.

The requisite heat may be supplied in a variety of ways such as direct heating by open gas flames, direct heating by electrically heated units arranged to heat by convection and radiation to the web, heating by hot gases supplied by passage of air or other gas over steam coils, electrical or gas heated units, or otherwise, heating by hot gases supplied by the combustion of gas, oil, coal or other fuel. The ultimate transfer of heat to the web is in all cases by convection and/or radiation since it would defeat the object of the invention to permit the web to touch any surface which might transfer heat to it by conduction. Since it is necessary to transfer a large amount of heat to the web in a short time, it is desirable, with any method used, to cause the heated gas, air or flames to impinge against the web with good velocity, thus reducing the surface film of air or gas on the web to a minimum and in accord with well known heat transfer principles obtain a maximum rate of heat transfer. When hot air or other gas is used for drying the web, the gas impinging on the bottom surface thereof may be given sufficient velocity to support the film, and the velocity of the gas directed against the top surface of the film regulated so as to compensate for any excessive upward thrust of the first-mentioned jets.

Although the present invention has been described with particular reference to regenerated cellulose, it is nevertheless applicable to webs made from other non-fibrous, transparent, shrinkable, cellulosic materials which are self-supporting during the drying thereof, or to non-fibrous, transparent, shrinkable, non-cellulosic sheets and films of similar nature.

Although the present invention is particularly useful in the drying of films carrying non-heat-flowable compositions, other materials which may be applied to sheets and films and dried with great advantage in accordance with the invention include moistureproofing compositions, materials which will prevent the transmission of ultra-violet light, compositions which may be applied for anchoring subsequent coatings to the film, and the like.

The fact that the removal of the requisite part of the liquid carried by the web can be achieved in a short time makes it possible to carry out the process on a commercial scale. In so doing, a long unsupported span of web is not required. By shortening the time required for the evaporation of the liquid, it is possible to shorten the necessary unsupported web span to a length which will not result in the production of wrinkles, and causes no undue strains on the web. When operating in accordance with this procedure, it is found that even heavily treated webs do not cause fouling of the roll surfaces, but come through the pre-drying and regular drying processes with perfectly satisfactory transparency and conformity. This invention is applicable, not only to freshly formed gel films or sheets, but applies equally well to rewetted, non-fibrous, shrinkable sheets or films which are desired to be dried.

The use of very intense heat to carry out the early stages of the drying leaves a very much smaller amount of drying for the conventional drier rolls which follow the hot treatment. This makes possible the design of a much shorter drier with its attendant lower investment costs and maintenance and, more especially, with the reduction of the factors which make for non-uniformity of drying and which are of course magnified as the size and number of components of a machine are increased. My invention permits of a very much higher drying speed for a given drier length and this becomes important due to current competitive conditions.

There is another very important advantage of my invention. In all drying machines available for this type of material, non-uniformity of drying across the sheet frequently exists even though the machine be well designed and operated. This is due to factors which appear from time to time and do not permit of a redesign of the machine, but must be controlled by operating technique. When non-uniformity of drying across the web takes place, the web has "wet bands" or "saggy edges" or similar defects. In other words, it is not a flat sheet, but when a considerable length of it is drawn tightly between two terminal supports so as to be held in a horizontal plane, the sheet does not lie in a horizontal plane but droops in one of several ways. Such a sheet is not useful for modern high speed wrapping machines, but must be relegated to uses requiring relatively small sheets and such uses are definitely a minor outlet. My invention permits of applying more or less heat across the sheet as dictated by the occasional development of wet bands with the production of a substantially flat sheet at all times.

It is to be understood that the specific embodiment of the invention illustrated and specifically described may be varied in many details of its construction within wide limits without departing from the nature and spirit of the invention and that the invention is to be limited only as set forth in the appended claims.

I claim:

1. In the method of drying highly shrinkable, non-fibrous, transparent, cellulosic webs, the steps comprising preliminarily drying wet webs by passing the same into close proximity with a plurality of open flames on both sides of said web while maintaining the same out of contact with any solid surface until the water content of said webs is below 225% thereof, and continuing the drying thereof while in contact with a drying surface.

2. In the method of drying highly shrinkable, non-fibrous, transparent, cellulosic webs adapted to be used as wrapping tissue, which webs have been treated with a treating liquid, the steps comprising preliminarily drying said wet webs by passing the same into close proximity with a plurality of open flames positioned on both sides of said web for a period of three to fifteen seconds while maintaining the same out of contact with any solid surface whereby to preliminarily dry the same, and completing the drying thereof while in contact with a drying surface.

3. In the method of drying highly shrinkable, non-fibrous, transparent, cellulosic webs adapted to be used as wrapping tissue, which webs have been treated with a treating liquid containing a material which will adhere to a contacting, solid surface when present in a web containing a substantial amount of water, the steps comprising preliminarily drying said wet webs by passing the same into close proximity with a plurality of open flames on both sides of said webs while maintaining the same out of contact with any solid surface until the water content thereof is reduced to the point where said material will not adhere to a contacting solid surface, and completing the drying thereof while in contact with a solid drying surface.

4. In an apparatus for drying a transparent, non-fibrous, shrinkable web, means for removing excess liquid from said web, a drying enclosure, a plurality of open flame jets arranged in said enclosure in multiple units on opposite sides of the web so that the entire width of the web is exposed to the hot gases, means for continuously moving said web through said enclosure without contacting any solid surface within said enclosure, and a series of drying rolls positioned closely adjacent each other between which the web is moved for further drying.

WALTER C. EBERLIN.